(12) United States Patent
Goodsitt et al.

(10) Patent No.: US 11,164,044 B2
(45) Date of Patent: Nov. 2, 2021

(54) SYSTEMS AND METHODS FOR TAGGING DATASETS USING MODELS ARRANGED IN A SERIES OF NODES

(71) Applicant: Capital One Services, LLC, McLean, VA (US)

(72) Inventors: Jeremy Goodsitt, Champaign, IL (US); Austin Walters, Savoy, IL (US); Mark Watson, Sedona, AZ (US); Reza Farivar, Champaign, IL (US); Anh Truong, Champaign, IL (US); Vincent Pham, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/722,481

(22) Filed: Dec. 20, 2019

(65) Prior Publication Data
US 2021/0192282 A1    Jun. 24, 2021

(51) Int. Cl.
*G06N 20/20* (2019.01)
*G06F 16/906* (2019.01)
(Continued)

(52) U.S. Cl.
CPC ......... *G06K 9/6257* (2013.01); *G06F 16/906* (2019.01); *G06F 16/9027* (2019.01); *G06F 16/9035* (2019.01); *G06N 20/20* (2019.01)

(58) Field of Classification Search
CPC . G06K 9/6257; G06F 16/906; G06F 16/9027; G06F 16/9035; G06N 20/20
See application file for complete search history.

(56) References Cited

U.S. PATENT DOCUMENTS

| | | | |
|---|---|---|---|
| 2014/0258254 A1* | 9/2014 | Suleiman | G06F 16/26 707/703 |
| 2016/0314123 A1* | 10/2016 | Ramachandran | G06F 16/24578 |

(Continued)

OTHER PUBLICATIONS

Mei, Qiaozhu, Xuehua Shen, and ChengXiang Zhai. "Automatic labeling of multinomial topic models." Proceedings of the 13th ACM SIGKDD international conference on Knowledge discovery and data mining. 2007: 490-499 (Year: 2007).*

(Continued)

*Primary Examiner* — Kamran Afshar
*Assistant Examiner* — Randall K. Baldwin
(74) *Attorney, Agent, or Firm* — Finnegan, Henderson, Farabow, Garrett & Dunner, LLP

(57) ABSTRACT

Systems and methods for managing indexing and tagging datasets using a plurality of nodes are disclosed. For example, the system may include one or more memory units storing instructions and one or more processors configured to execute the instructions to perform operations. The operations may include receiving a dataset comprising a plurality of columns and applying a series of nodes to the dataset. Applying the series of nodes may comprise applying a first node comprising a machine learning model to generate a first probability, appending a first tag based on the first probability, and selecting second nodes subsequent in the series based on the first probability. Applying the series may include iteratively applying the selected second nodes to generate second probabilities and second tags. The operations may include generating a data structure comprising the first and second probabilities and first and second tags. The operations may include outputting metadata.

20 Claims, 9 Drawing Sheets

(51) Int. Cl.
    *G06F 16/9035*    (2019.01)
    *G06K 9/62*       (2006.01)
    *G06F 16/901*     (2019.01)

(56) References Cited

U.S. PATENT DOCUMENTS

| | | | | |
|---|---|---|---|---|
| 2018/0096372 A1* | 4/2018 | Rickard, Jr. | ........... | G06N 20/00 |
| 2018/0308025 A1* | 10/2018 | Bansal | ................... | G06N 20/20 |
| 2019/0188562 A1* | 6/2019 | Edwards | .................. | G06N 3/04 |
| 2019/0294999 A1* | 9/2019 | Guttmann | ............ | G06K 9/6219 |
| 2019/0317961 A1* | 10/2019 | Brener | .................. | G06F 16/906 |
| 2020/0104731 A1* | 4/2020 | Oliner | .................... | G06F 16/245 |
| 2020/0342968 A1* | 10/2020 | Avinash | .................. | G06F 9/451 |

OTHER PUBLICATIONS

Song, Yang, et al. "Real-time automatic tag recommendation." Proceedings of the 31st annual international ACM SIGIR conference on Research and development in information retrieval. 2008: 515-522 (Year: 2008).*

Rubin, Timothy N., et al. "Statistical topic models for multi-label document classification." Machine learning 88.1-2 (2012): 157-20 (Year: 2012).*

Truong, Anh, et al. "Towards Automated Machine Learning: Evaluation and Comparison of AutoML Approaches and Tools." arXiv preprint arXiv: 1908.05557 (Aug. 15, 2019). (Year: 2019).*

* cited by examiner

| | Results |
|---|---|
| Column 1 (502a) | Phone - Probability 97%<br>U.S. Phone - Probability 78%<br>NYC Phone - Probability 85% |
| Column 2 (502b) | Address - Probability 97%<br>U.S. Address - Probability 65%<br>NYC Address - Probability 60% |
| Column 3 (502c) | Social Security Number - Probability 57%<br>OR Telephone – Probability 43% |
| Column 4 (502d) | Identification Card Number - Probability 45%<br>OR Telephone – Probability 55%<br>DC Identification Card Number - Probability 65%<br>OR U.S. Telephone – Probability 55% |

802 Receive a plurality of datasets comprising a plurality of columns

804 Apply a series of nodes to at least one first column and at least one second column of the plurality of datasets

806 Receive first probabilities from the series of nodes based on the at least one first column and second probabilities from the series of nodes based on the at least one second column

808 Determine a first vector using the first probabilities and a second vector using the second probabilities

810 Output a distance between the at least one first column and the at least one second column based on the first and second vector

Fig. 8

SYSTEMS AND METHODS FOR TAGGING DATASETS USING MODELS ARRANGED IN A SERIES OF NODES

TECHNICAL FIELD

The disclosed embodiments relate to a platform for indexing and mapping datasets using nodes. In particular, the disclosed embodiments relate to techniques for indexing datasets using models arranged in a series of nodes. In addition, the disclosed embodiments may train the models and compare datasets using the generated indices.

BACKGROUND

Modern computing often uses a large number of datasets, whether text files, images, or other formats (such as portable document format (pdf), Microsoft Word® format, Microsoft Excel® format or the like). However, it is difficult and costly to maintain and store these datasets in a meaningful fashion. Indeed, conventionally, many datasets are lost on company-wide systems due to inability to effectively find and use sets, especially when datasets are dumped into a data lake rather than indexed and stored.

Moreover, traditional mechanisms of indexing datasets generally apply traditional models (such as neural networks) or ensemble models to perform classification and indexing. Conventional approaches to data classification may involve applying models in parallel without coordination or with minimal coordination between models and comparing results. This approach suffers from drawbacks. For example, by applying models in parallel, models do not learn from one another and inefficiently waste resources. Further, conventional approaches may suffer from reduced accuracy of the classification for certain types of datasets because models are trained generally to identify features of a wide variety of datasets but not trained to identify or classify specific features of certain types of datasets. Further, by implementing models in parallel, models may consider more data than necessary to generate a data index and more models may be used than necessary, which in turn may require increased computer processing power and/or memory or storage capacity. Embodiments of the present disclosure may solve these technical problems at least because embodiments include a solution for training and implementing series of nodes to index and compare datasets, the nodes comprising models. Moreover, the embodiments of the present disclosure reduce both the number of models used to generate a data index, and/or reduce the amount of data necessary to generate the data index, helping to reduce the needed computer processing power and memory or storage capacity.

SUMMARY

Consistent with disclosed embodiments, systems, methods, and computer readable media are provided for indexing and mapping datasets using models in a series of nodes as well as training the models for arrangement in a series of nodes and for comparing indexed models.

The disclosed embodiments may include a system for tagging datasets by a plurality of nodes. The system may comprise at least one processor and at least one non-transitory memory storing instructions that, when executed by the at least one processor cause the at least one processor to perform operations. The operations may comprise receiving at least one dataset, the at least one dataset comprising a plurality of columns and applying a series of nodes to the at least one dataset. Applying a series of nodes to the at least one dataset may comprise applying a first one of the nodes comprising at least one machine learning model to generate at least one first probability; appending a first tag based on the at least one first probability; selecting second ones of the nodes subsequent in the series based on the at least one first probability; and iteratively applying the second nodes to generate second probabilities and second tags. The operations may further comprise generating a data structure comprising the first and second probabilities and the first and second tags and outputting the first and second tags including the first and second probabilities as metadata.

The disclosed embodiments may further include a system for building an ensemble model for tagging datasets. The system may comprise at least one processor and at least one non-transitory memory storing instructions that, when executed by the at least one processor cause the at least one processor to perform operations. The operations may comprise training a series of nodes, which may comprise training at least one first machine learning model to classify a column of data within a first category; training a plurality of second machine learning models to classify the column of data within a plurality of subcategories of the first category; and iteratively training third machine learning models to perform subclassifications of the plurality of subcategories. The operations may further comprise arranging the trained first, second, and third models in the series according to levels of classification and determining a plurality of transition probabilities governing movement between the arranged models.

The disclosed embodiments may further include a system for tagging datasets by a plurality of nodes. The system may comprise at least one processor and at least one non-transitory memory storing instructions that, when executed by the at least one processor cause the at least one processor to perform operations. The operations may comprise receiving at least one dataset and applying a series of nodes to the at least one dataset. Applying a series of nodes to the at least one dataset may comprise applying a first one of the nodes comprising at least one machine learning model to generate at least one first probability; appending a first tag based on the at least one first probability; selecting second ones of the nodes subsequent in the series based on the at least one first probability; iteratively applying second ones of the nodes to generate second probabilities and second tags; and terminating the iterative application upon one of the following conditions: a final node in the series has been applied; or one of the second probabilities is below a threshold. The operations may further comprise generating a data structure comprising the first and second probabilities and the first and second tags and outputting the first and second tags with the first and second probabilities as metadata, the metadata further comprising an indicator of the condition terminating the iterative application.

The disclosed embodiments may further include a system for comparing datasets tagged by a plurality of nodes. The system may comprise at least one processor and at least one non-transitory memory storing instructions that, when executed by the at least one processor cause the at least one processor to perform operations. The operations may comprise receiving a plurality of datasets comprising a plurality of columns; applying a series of nodes to at least one first column of a first one of the datasets, the series comprising a plurality of levels; receiving, based on application of the series of nodes, a plurality of first probabilities associated with the levels; determining, using the first probabilities, a first vector associated with the at least one first column; applying the series of nodes to at least one second column of a second one of the datasets; receiving, based on application of the series of nodes, a plurality of second probabilities associated with the levels; determining, using the second probabilities, a second vector associated with the at least one second column; and outputting a distance between the at least one first and the least one second columns, based on the first and second vectors.

The disclosed embodiments may further include a system for comparing datasets tagged by a plurality of nodes. The system may comprise at least one processor and at least one non-transitory memory storing instructions that, when executed by the at least one processor cause the at least one processor to perform operations. The operations may comprise receiving a plurality of datasets comprising a plurality of columns; applying a series of nodes to at least one first column of a first one of the datasets, the series comprising a plurality of levels; receiving, based on application of the series of nodes, a plurality of first tags associated with the levels; determining, using the first tags, a first vector associated with the at least one first column; applying the series of nodes to at least one second column of a second one of the datasets; receiving, based on application of the series of nodes, a plurality of second tags associated with the levels; determining, using the second tags, a second vector associated with the at least one second column; and outputting a distance between the at least one first and the at least one second columns based on the first and second vectors.

The disclosed embodiments may further include a system for comparing datasets tagged by a plurality of nodes. The system may comprise at least one processor and at least one non-transitory memory storing instructions that, when executed by the at least one processor cause the at least one processor to perform operations. The operations may comprise receiving a plurality of datasets comprising a plurality of columns; applying a series of nodes to at least one first column of a first one of the datasets, the series comprising a plurality of levels; receiving, based on application of the series of nodes, a plurality of first probabilities associated with the levels; determining, using the first probabilities, a first vector associated with the at least one first column; applying the series of nodes to at least one second column of a second one of the datasets; receiving, based on application of the series of nodes, a plurality of second probabilities associated with the levels; determining, using the second probabilities, a second vector associated with the at least one second column; calculating a first distance between the at least one first and the least one second columns based on the first and second vectors; applying the series of nodes to at least one third column of the first one of the datasets; receiving, based on application of the series of nodes, a plurality of third probabilities associated with the levels; determining, using the third probabilities, a third vector associated with the at least one third column; applying the series of nodes to at least one fourth column of the second one of the datasets; receiving, based on application of the series of nodes, a plurality of fourth probabilities associated with the levels; determining, using the fourth probabilities, a fourth vector associated with the at least one fourth column; calculating a second distance between the at least one third and the least one fourth columns based on the third and fourth vectors; and outputting a total distance between the datasets based on the first and second distances.

Consistent with other disclosed embodiments, non-transitory computer readable storage media may store program instructions, which are executed by at least one processor device and perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments consistent with the disclosure and, together with the description, serve to explain the principles of the disclosure. The drawings are not necessarily to scale or exhaustive. Instead, emphasis is generally placed upon illustrating the principles of the embodiments described herein. In the drawings:

FIG. 5 depicts an exemplary output showing classifications of datasets, consistent with disclosed embodiments.

FIG. 8 depicts an exemplary process for comparing datasets indexed using a series of nodes, consistent with disclosed embodiments.

DETAILED DESCRIPTION

Figure 1:
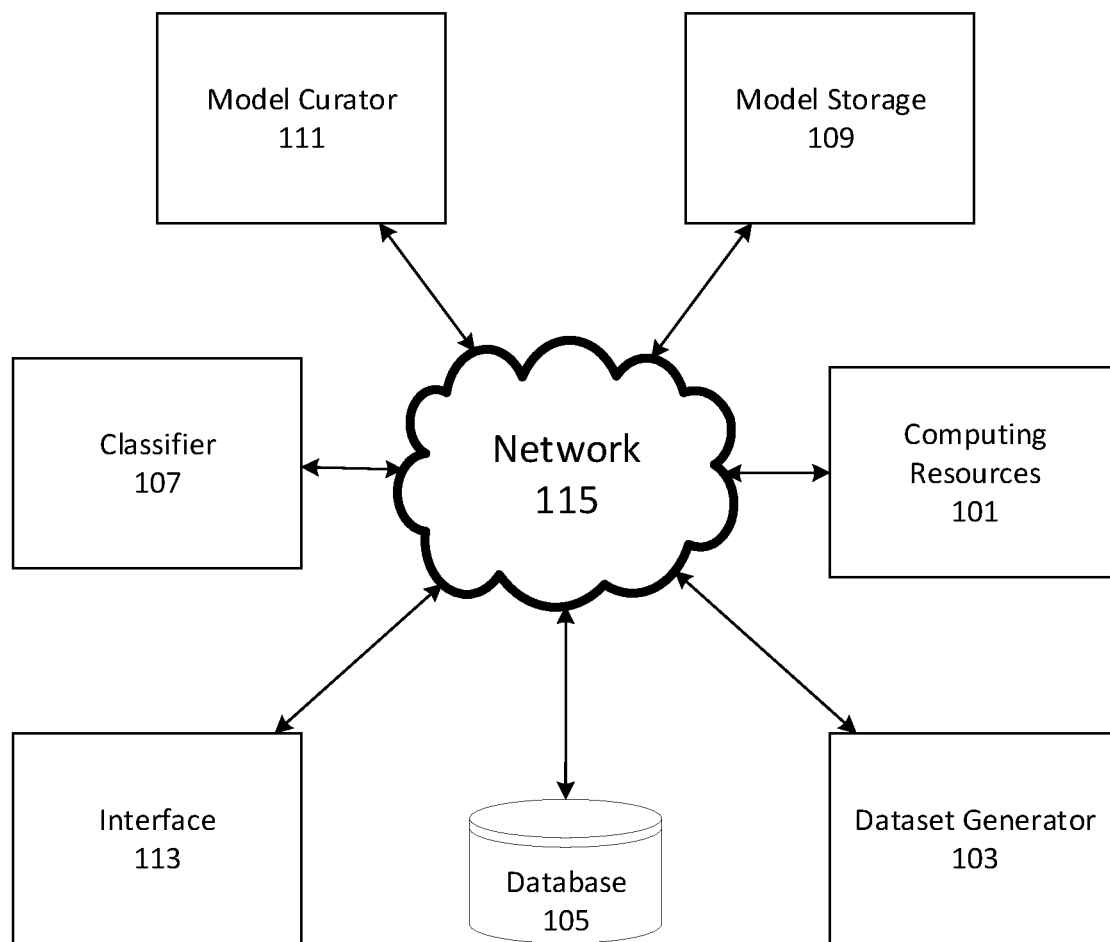
FIG. 1 depicts an exemplary cloud-computing environment for indexing and comparing datasets, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

The disclosed embodiments may be used to automatically index and compare datasets more accurately and robustly. Using a plurality of models arranged as a series of nodes, applied to the datasets, the disclosed embodiments may produce more detailed and more accurate classifications and index the datasets using those classifications. In various embodiments, the disclosed systems may use a plurality of models arranged in a series of nodes to increase efficiency as compared with other techniques for classifying datasets. In addition, the more detailed classifications produced by the series of nodes allow for more robust comparisons within and between datasets than other techniques. In some embodiments, a number of models needed to index and compare datasets may be reduced as compared to conventional systems because a node may contain multiple children, thereby leading to improved computational efficiency and speed.

In some aspects, datasets of the embodiments may comprise unstructured data, such as one or more JSON (JavaScript Object Notation), one or more delimited files (e.g., comma-separated value (CSV) files or the like), or the like or structured data, such as one or more relational data structures (e.g., tabular data or the like), one or more graphical data structures, or the like. Graphical data structures may include a visualization of data and/or a relationship between data. Graphical data structures may include a node-edge diagram where a node, in this context, refers to a cluster (i.e., grouping of data according to a shared characteristic) and an edge refers to a relationship between clusters such as a data lineage, a dependency (e.g., a spatial or time dependency). In some embodiments, datasets may be stored in a graphical database that may use graph structures comprising node-edge relationships to organize and query data. Datasets of the embodiments may have a data schema (i.e., structure), including a data type, key-value pair, label, metadata, field, relationship, view, index, package, procedure, function, trigger, sequence, synonym, link, directory, queue, or the like.

Embodiments consistent with the present disclosure may include nodes. A node may include one or more models, such as neural network models, as described herein. Embodiments may include a series of nodes (i.e., one or more nodes configured in sequence). For example, a first node in a series of nodes may receive an input and pass output to a second node in a series of nodes. Nodes may be arranged in layers, and layers may be arranged in a series. For example, a layer may include one or more models that receive input data and generate output data, and the output of one layer may be passed as an input to another layer.

Embodiments consistent with the present disclosure may include tags. A tag may include a label, metadata, text data, or any other data associated with tagged data (i.e., an aspect of a dataset). For example, a tag may be associated with a column of a dataset, a data entry of a dataset, a dimension of a dataset, or other aspect of a dataset. As an illustrative example, a dataset may include voter polling data, and a tag may include a label classifying a voter as 'liberal' or 'conservative.' A tag may label a data object, such as an image object (e.g., an image comprising a cat may be tagged as "cat").

Embodiments consistent with the present disclosure may include data indexes. A data index may include information based on one or more datasets, organized to be efficiently searchable. For example, a data index may include an arrangement of information organized into a structure such as a tree structure (e.g., a B-Tree). A data index may include, for example, a RUM-index, a GIN-index. A data index may be based on a k-nearest neighbor clustering method. A data index may include tags and/or statistical properties of a dataset.

FIG. 1 depicts a cloud-computing environment 100 for indexing and searching datasets. Environment 100 may be configured to support indexing of datasets, retrieval and comparison of datasets, training neural networks and other models to classify datasets, and imposition of rules on indexed datasets. Environment 100 may be configured to expose an interface for communication with other systems. Environment 100 may include computing resources 101, dataset generator 103, database 105, classifier 107, model storage 109, model curator 111, and interface 113. These components of environment 100 may be configured to communicate with each other, or with external components of environment 100, using network 115. The particular arrangement of components depicted in FIG. 1 is not intended to be limiting. System 100 may include additional components, or fewer components. Multiple components of system 100 may be implemented using the same physical computing device or different physical computing devices.

Computing resources 101 may include one or more computing devices configurable to index and compare datasets. The computing devices may include special-purpose computing devices, such as graphical processing units (GPUs) or application-specific integrated circuits. The cloud computing resources may include general-purpose computing devices. The computing devices may be configured to host an environment for indexing and comparing datasets. For example, the computing devices may host virtual machines, pods, or containers. The computing devices may also be configured to run applications for generating data models. For example, the computing devices may be configured to run SAGEMAKER, Tensorflow, or similar machine learning training applications. Computing resources 101 may be configured to receive models for training from model storage 109, or another component of system 100. Computing resources 101 may be configured to index and compare datasets using classifications from models (e.g., from model storage 109) arranged in a series of nodes. For example, computing resources 101 may traverse the nodes to select a cascading series of models to apply to one or more of the datasets, synthetic versions of the datasets, metadata associated with the datasets, or the like.

Dataset generator 103 may include one or more computing devices configured to generate data. Dataset generator 103 may be configured to provide data to computing resources 101, database 105, to another component of system 100 (e.g., interface 113), or to another system (e.g., an APACHE KAFKA cluster or other publication service). Dataset generator 103 may be configured to receive data from database 105 or another component of system 100. Dataset generator 103 may be configured to receive data models from model storage 109 or another component of system 100. In some embodiments, dataset generator 103 may be configured to generate synthetic data. For example, dataset generator 103 may be configured to generate synthetic data by identifying and replacing sensitive information in data received from database 103 or interface 113. Sensitive information may include confidential information, information identifying a person, private information, or the like. As an additional example, dataset generator 103 may be configured to generate synthetic data using a data model without reliance on input data. For example, the data model may be configured to generate data matching statistical and content characteristics of a training dataset. In some aspects, the data model may be configured to map from a random or pseudorandom vector to elements in the training data space.

In any embodiments where dataset generator 103 generates synthetic data, dataset generator 103 may use one or more neural networks, e.g., retrieved from model storage 109, trained using stored datasets, or the like. Accordingly, dataset generator 103 may generate data with the neural network(s) and/or provide the neural network(s) to classifier 107 for further processing.

Database 105 may include one or more databases configured to store indexed datasets for use by system 100. Additionally or alternatively, database 105 may store models associated with datasets. For example, database 105 may store models associated with generalized representations of those models (e.g., neural network architectures stored in TensorFlow or other standardized formats). The databases may include cloud-based databases (e.g., AMAZON WEB SERVICES S3 buckets) or on-premises databases. As explained above, the models may comprise one or more neural networks configured to generate synthetic datasets.

Classifier 107 may include one or more computing systems configured to index data models for system 100. For example, classifier 107 may be configured to apply models arranged as a series of nodes to generate tags and corresponding probabilities for indexing and subsequent searching thereof by computing resources 101. The models may comprise one or more neural networks, one or more Bayesian networks, one or more support vector machines, one or more random forest models, or the like. Classifier 107 may apply the series of nodes to the datasets themselves, to metadata associated with the datasets, and/or to synthetic datasets in addition to or in lieu of the datasets themselves. For example, metadata may include any supplemental data not comprising the structured or unstructured data of the set itself, such as dates and/or times of creation, dates and/or times of modification, authors, filenames, version numbers associated with applications generating the dataset, or the like. Applying the series of nodes to the datasets may comprise applying one or more models in a first layer of the series of nodes and, based on one or more tags and/or one or more probabilities output by the model(s), proceeding to select one or more models in a second layer of the series to apply. Classifier 107 may iteratively proceed through the series based on one or more tags and/or one or more probabilities output by models within the series. In some embodiments, classifier 107 may additionally or alternatively apply the series of nodes to synthetic data, e.g., generated by one or more neural networks.

Any of the models described above (e.g., with the first layer, within the second layer, or the like) may comprise models of a same type or different types. For example, classifier 107 may apply a neural network type, a Bayesian network type, a support vector machine type, a random forest type, or another type of model within the first layer to the datasets, associated metadata, related synthetic data, or the like. Additionally, classifier 107 may apply a neural network type, a Bayesian network type, a support vector machine type, a random forest type, or another type of model within the second layer to the datasets, associated metadata, related synthetic data, or the like.

Classifier 107 may also be configured to search the indexed datasets based on instructions received from a user or another system. These instructions may be received through interface 113. For example, classifier 107 may be configured to receive a search query and retrieve datasets based on the query and using tags and probabilities generated by classifier 107 with computing resources 101.

In such embodiments, classifier 107 may be configured to apply one or more layers of the series of nodes (the nodes comprising one or more of a neural network type, a Bayesian network type, a support vector machine type, a random forest type, or another type of model) to dataset(s), associated metadata, or related synthetic data included in or generated based on the query to search the indexed datasets using tags and probabilities generated by the series of nodes. Accordingly, classifiers 107 may be configured to search for datasets having tags and/or probabilities matching or similar to those generated by the series of nodes based on the query.

Additionally or alternatively, classifier 107 may also be configured to compare the indexed datasets, e.g., based on instructions received from a user or another system. These instructions may be received through interface 113. For example, classifier 107 may be configured to receive a selection of one or more of the indexed datasets and compare the selected datasets using tags and probabilities generated by classifier 107 with computing resources 101. Additionally or alternatively, classifier 107 may be configured to receive a search query, retrieve datasets based on the query, as described above, and compare the retrieved datasets using tags and probabilities generated by classifier 107 with computing resources 101.

In such embodiments, classifier 107 may be configured to apply one or more layers of the series of nodes (e.g., one or more of a neural network type, a Bayesian network type, a support vector machine type, a random forest type, or another type of model within the layers) to the datasets, associated metadata, or related synthetic data in order to generate tags and probabilities for comparing the datasets. For example, classifiers 107 may be configured to search for datasets having tags and/or probabilities matching or similar to those generated by the series of nodes based on the query.

Model storage 109 may include one or more databases configured to store data models associated with the datasets. For example, the data models may comprise parsing models, synthetic data generation models, classification models or the like. Model storage 109 may be configured to provide information regarding available data models to a user or another system (e.g., classifier 107). This information may be provided using interface 113. The databases may include cloud-based databases (e.g., AMAZON WEB SERVICES S3 buckets) or on-premises databases. The information may include metadata associated with the models, a structure of a series of nodes in which the models are arranged, or the like.

Model curator 111 may be configured to train the models stored in storage 109. For example, model curator 111 may be configured to train neural networks to parse datasets and/or generate synthetic datasets. Additionally or alternatively, model curator 111 may be configured to train models, such as a neural network model, a Bayesian network model, a support vector machine, a random forest model, or the like to generate tags and probabilities for classifying datasets, as explained above. Training may use the datasets as input and include modification of weights and/or activation functions of nodes within the neural network to reduce one or more associated loss functions.

Interface 113 may include one or more processors configured to manage interactions between system 100 and other systems using network 115. In some aspects, interface 113 may be configured to publish data received from other components of system 100 (e.g., dataset generator 103, computing resources 101, database 105, or the like). This data may be published in a publication and subscription framework (e.g., using APACHE KAFKA), through a network socket, in response to queries from other systems, or using other known methods. The data may be synthetic data, as described herein. As an additional example, interface 113 may be configured to provide results from indexed datasets in database 105 in response to a query received via interface 113 and/or calculations for comparing indexed datasets in database 105 in response to an instruction received via interface 113. In various aspects, interface 113 may be configured to provide data or instructions received from other systems to components of system 100. For example, interface 113 may be configured to receive instructions for retrieving or comparing datasets (e.g., according to a query of indexed datasets and/or an instruction to compare selected datasets) from another system and provide this information to classifier 107. As an additional example, interface 113 may be configured to receive data including sensitive information from another system (e.g. in a file, a message in a publication and subscription framework, a network socket, or the like) and provide that data to dataset generator 103 or database 105. Sensitive information may include confidential information, information identifying a person, private information, or the like.

Network 115 may include any combination of electronic communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

Disclosed herein are improved systems and methods for efficiently and accurately indexing and comparing datasets. In some embodiments, a series of nodes with differently trained data models may be used to classify and index the datasets. For example, the series of nodes may generate a series of tags and associated probabilities for indexing the datasets, as explained above.

In some embodiments, one or more data models may generate synthetic data. For example, the data models may be trained to generate synthetic datasets with structural similarities to datasets used for training. Additionally or alternatively, these data models may parse unstructured data to generate structured data. As used herein, "unstructured" does not necessarily refer to data that is haphazard or lacking in discernible patterns. Rather, "unstructured" data may refer to data stored without logical connection among portions even if the data is stored, for example, as a text file with a pattern and delimiter that impart meaning to the data even though no logical connection is stored. Accordingly, the "structure" of any unstructured data may comprise patterns, delimiters, and other components of the data that impart meaning. Moreover, as used herein, a structural similarity may refer to any similarity in organization (e.g., one or more overlapping columns, form fields, or the like), any similarity in statistical measures (e.g., statistical distribution of letters, numbers, pixels, or the like), or the like.

Figure 2A:
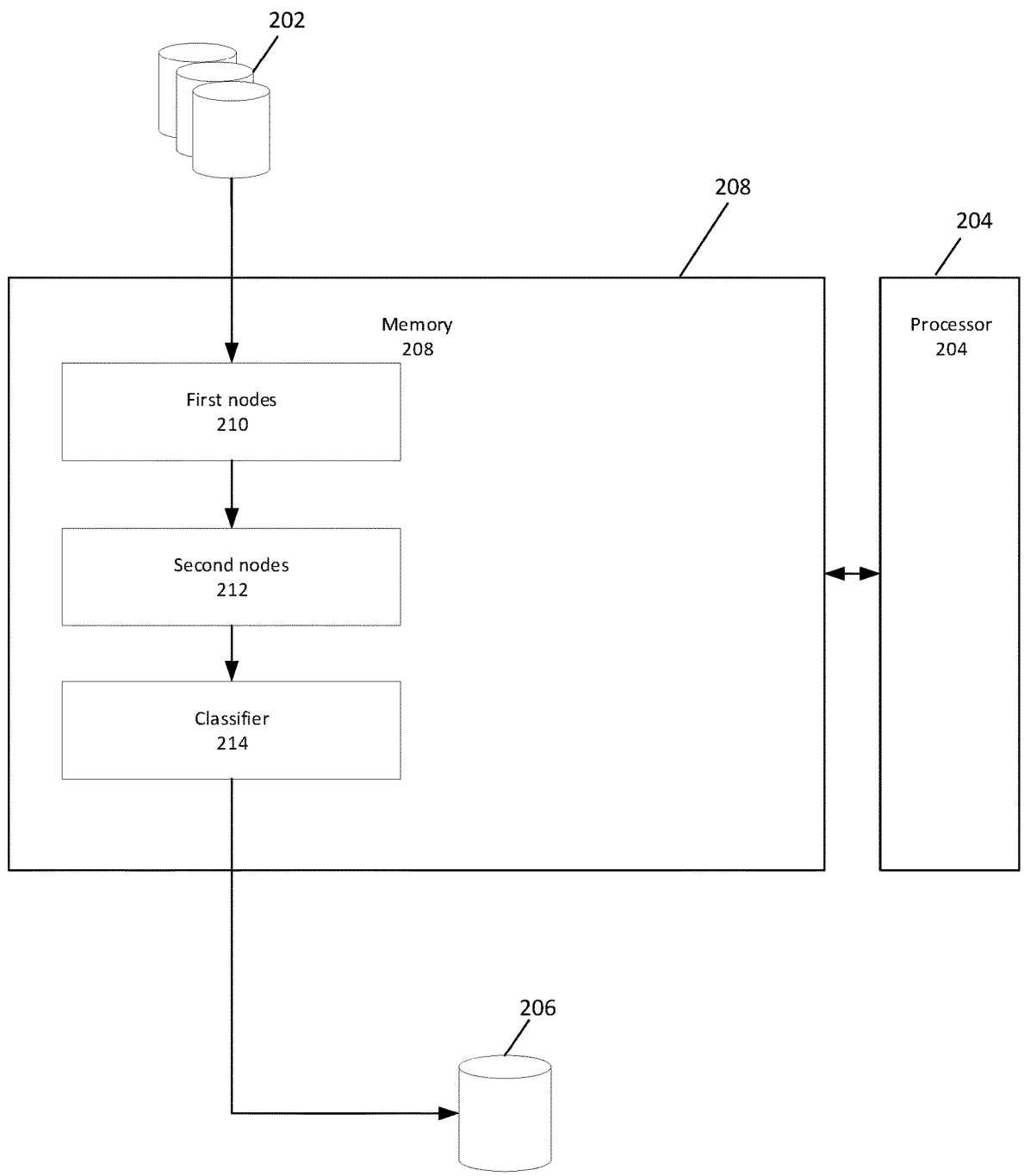
FIG. 2A depicts an exemplary system for indexing datasets using a series of nodes, consistent with disclosed embodiments.

FIG. 2A depicts an exemplary system 200 for indexing datasets, consistent with disclosed embodiments. System 200 may include one or more databases 202, one or more processors 204, and one or more databases 206. The one or more processors may execute one or more programs (e.g., first nodes 210, second nodes 212, and classifier 214) for indexing datasets. The one or more programs may be stored in a memory 208, as depicted in FIG. 2A. System 200 may be implemented as a component of system 100 or may be a system separate from system 100.

Databases 202 may include one or more databases configured to store datasets for use by system 200. In some embodiments, databases 202 may be included in database 115 of system 100. Databases 202 may include cloud-based databases (e.g., AMAZON WEB SERVICES S3 buckets) and/or on-premises databases. In some embodiments, databases 202 may additionally store data models for parsing the datasets (e.g., from unstructured data to structured data), for generating synthetic datasets, and/or for classifying datasets.

Databases 206 may also include one or more databases configured to store data for use by system 200. Databases 206 may include cloud-based databases (e.g., AMAZON WEB SERVICES S3 buckets) and/or on-premises databases. In some embodiments, databases 206 may store training data for the data models and/or indexing information associated with the datasets. Database 206 may be included as a part of previously described database 115.

First nodes 210 may receive one or more datasets from databases 202. The one or more datasets may include text files (e.g., logs generated by one or more applications), image files, or any other set of unstructured or structured data. First nodes 210 may generate one or more tags and associated probabilities, e.g., for each column of data within the received dataset(s). In an embodiment, first nodes 210 may include one or more models, such as one or more neural networks, Bayesian networks, support vector machines, random forest models, or the like. For example, first nodes 210 may include different models to classify the dataset in at least one of a plurality of categories.

As used herein, a column may refer to any portion of a dataset. In some embodiments, a column may be grouped by space (e.g., a column within a tabular data structure), by logic (e.g., linked to a same node of a graphical database and/or by a same edge of the graphical database, linked to a same index and/or identifier of a relational database, or the like), or any other mechanism for partitioning one or more data structures comprising the dataset. Additionally or alternatively, a column may comprise a portion of the one or more data structures selected by a processor using the one or more data structures even if the portion is not necessarily grouped by a partitioning mechanism within the one or more data structures.

Although not depicted in FIG. 2A, processor 204 may further train and/or re-train first nodes 210 before application to the received dataset(s). For example, processor 204 may use training data (e.g., from database(s) 206) and/or the received dataset(s) to train first nodes 210. In embodiments where training data is used, processor 204 may further use the received dataset(s) to re-train first nodes 210.

Second nodes 212 may receive the same dataset(s) received by first nodes 210 from databases 202. Processor 204 may select second nodes 212 from a plurality of nodes based on the tags and/or probabilities output from first nodes 210. For example, processor 204 may apply one or more transition rules (e.g., a Boolean rule such as an inequality or the like) to the at least one probability from first nodes 210 to select second nodes 212 for application to the received dataset(s). An inequality may indicate whether a number is greater or less than another number, for example, such as whether a probability meets a threshold criterion. A transition rule may include a logical expression or other algorithm that accepts output from one or more nodes (e.g., first nodes 210) and selects one or more other nodes (e.g., second nodes 220) from among a plurality of candidate nodes. A transition rule may include an indication that the output of a first node is likely to generate a high confidence level or probability for a classification when passed to a second node as an input. In this way, a transition rule may help processor 204 to identify nodes that can efficiently and effectively classify data. For example, input data may comprise images, and a first node may produce output indicating the images are likely to comprise animals, and, based on a transition rule, processor 204 may select a second node that performs well when classifying animals.

Similar to first nodes 210, second nodes 212 may include one or more models, such as one or more neural networks, Bayesian networks, support vector machines, random forest models, or the like that classify datasets into one or more categories. Moreover, similar to first nodes 210, second nodes 212 may output one or more tags and associated probabilities, e.g., for each column of data within the received dataset(s).

In any of the embodiments described above, the model(s) may include statistical algorithms. For example, a dataset may include variables such as time, location, and temperature, and the model(s) may include regression models that estimate the relationships among variables associated with the received dataset(s) and generate tags (e.g., indicating a category into which the model(s) have classified the dataset(s)) and indicators of confidence (e.g., associated probabilities, confidence scores, or the like) based thereon. In some aspects, the model(s) may additionally or alternatively sort elements of the received dataset(s) using one or more classifiers to determine the indicators of confidence (e.g., associated probabilities or the like) based thereon. The model(s) may be parametric (i.e. a statistical model whose sample space includes a finite number of parameters, such as a Poisson model), non-parametric (i.e., a statistical model whose sample space includes an infinite number of parameters), and/or semi-parametric (i.e., a statistical model whose sample space includes some finite-dimensional parameters and some infinite-dimensional parameters).

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include random forests, composed of a combination of decision trees. Such decision trees may comprise a data structure mapping observations about an input, in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learned models may be applied in addition to or in lieu of a random forest model.

In another example, additionally or alternatively, the model(s) may include Bayesian networks. The Bayesian network may comprise a directed acyclic graph (DAG). In some embodiments, the nodes of the DAG may represent Bayesian variables, such as observable quantities, latent variables, unknown parameters or hypotheses, or the like. Edges of the DAG may represent conditional dependencies between the nodes. Moreover, each node may be associated with a probability function that accepts, as input, a particular set of values for the node's parent variables, and outputs a probability (or probability distribution) of the variable represented by the node.

In yet another example, additionally or alternatively, the model(s) may include support vector machines. The support vector machine may comprise a non-probabilistic binary linear classifier. In some embodiments, the support vector machine may comprise one or more hyperplanes in a high- or infinite-dimensional space used to classify datasets.

Although not depicted in FIG. 2A, processor 204 may further train and/or re-train second nodes 212 before application to the received dataset(s). For example, processor 204 may use training data (e.g., from database(s) 206) and/or the received dataset(s) to train second nodes 212. In embodiments where training data is used, processor 204 may further use the received dataset(s) to re-train second nodes 212.

In addition to or in lieu of application to the received dataset(s), first nodes 210 and/or second node 212 may generate tags and associated probabilities based on metadata. For example, first nodes 210 and/or second nodes 212 may generate the tags and associated probabilities based on metadata associated with the received dataset(s). Additionally or alternatively, first nodes 210 and/or second nodes 212 may generate the tags and associated probabilities based on synthetic datasets generated based on the received dataset(s).

Although depicted with two sets of nodes (first nodes 210 and second nodes 212), system 200 may include any number of layers, each including one or more nodes, organized as a series of nodes for generating tags and associated probabilities. As explained above, processor 204 may apply one or more transition rules (e.g., inequalities or the like) to the one or more probabilities from a preceding layer to select nodes within a subsequent for application to the received dataset(s). Processor 204 may proceed until all layers are applied and/or when a threshold configured to halt iterative application of the layers is satisfied by a corresponding probability. For example, processor 204 may halt iterative application when a corresponding probability is high (e.g., indicating classification is complete without needing to apply subsequent layers) or low (e.g., indicating classification is too uncertain to proceed further).

Classifier 214 may index the received dataset(s) by the tags and associated probabilities from first nodes 210 and second nodes 212. Accordingly, classifier 214 may generate a relational mapping, a graphical mapping, or any other index configured for use to search for the received dataset(s) and compare the received dataset(s) with other datasets based on the tags and associated probabilities from first nodes 210 and second nodes 212.

As further depicted in FIG. 2A, the indexed datasets may be output for storage, e.g., in databases 206. Additionally or alternatively, the indexed datasets may be output to an external device, e.g., another server, a third party data repository (e.g., AMAZON WEB SERVICES S3 buckets), a user such as an administrator diagnosing a problem, or the like.

Figure 2B:
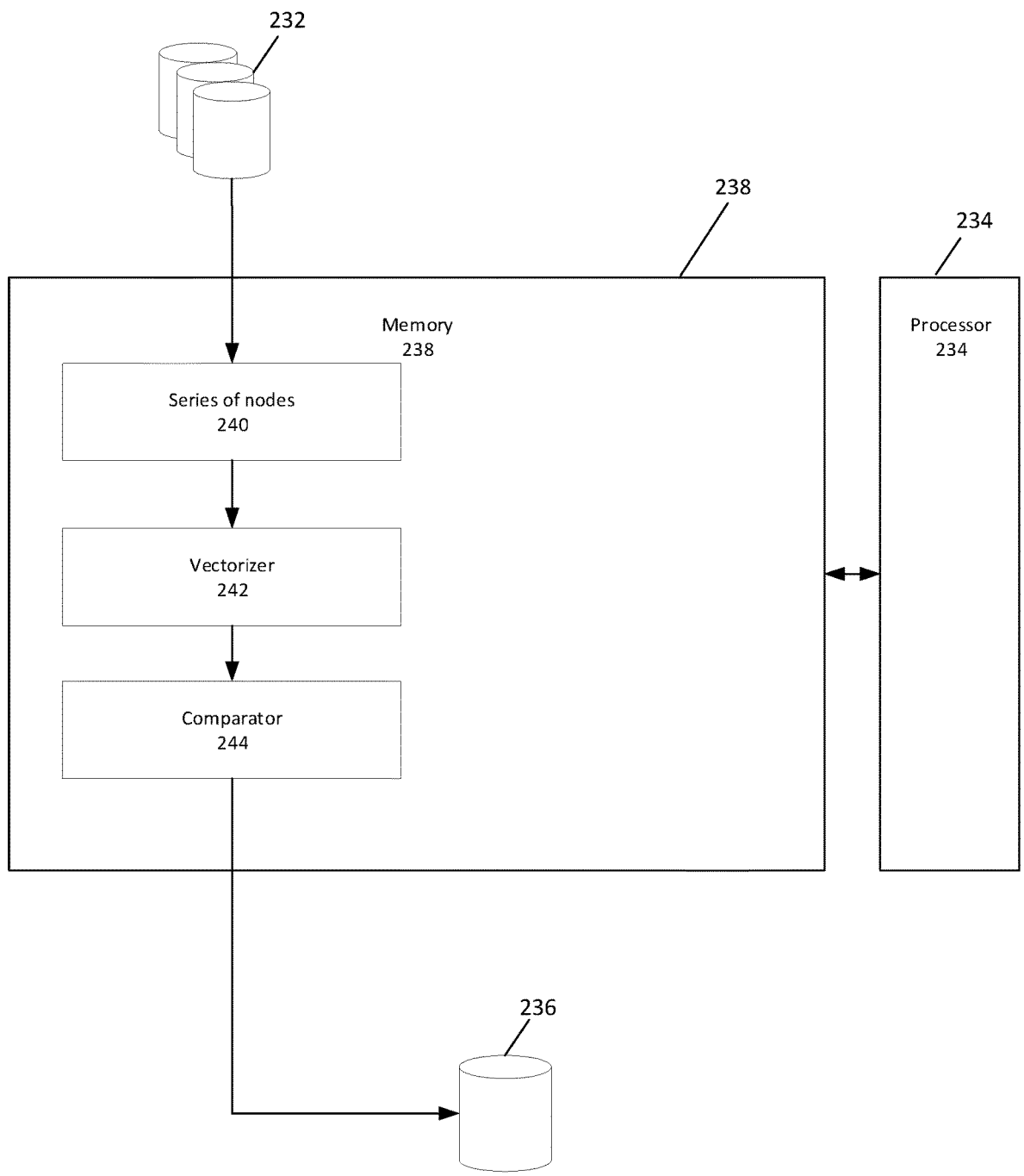
FIG. 2B depicts an exemplary system for comparing datasets using a series of nodes, consistent with disclosed embodiments.

FIG. 2B depicts an exemplary system 230 for searching and comparing datasets, consistent with disclosed embodiments. System 230 may include one or more databases 232, one or more processors 234, and one or more databases 236. The one or more processors may execute one or more programs (e.g., series of nodes 240, vectorizer 242, and comparator 244) for comparing datasets. The one or more programs may be stored in a memory 238, as depicted in FIG. 2B. System 230 may be implemented as a component of system 100 or may be a system separate from system 100.

Databases 232 may include one or more databases configured to store datasets for use by system 230. In some embodiments, databases 232 may be included in database 115 of system 100. Databases 232 may include cloud-based databases (e.g., AMAZON WEB SERVICES S3 buckets) and/or on-premises databases. In some embodiments, databases 232 may additionally store data models for parsing the datasets (e.g., from unstructured data to structured data), for generating synthetic datasets, and/or for classifying datasets.

Databases 236 may also include one or more databases configured to store data for use by system 230. Databases 236 may include cloud-based databases (e.g., AMAZON WEB SERVICES S3 buckets) and/or on-premises databases. In some embodiments, databases 236 may store training data for the data models and/or indexing information associated with the datasets. Database 236 may be included as a part of previously described database 115.

Although not depicted in FIG. 2B, processor 234 may receive a query for datasets. For example, processor 234 may receive the query from databases 232 and/or from an interface (not shown) connected to system 230. The query may include an example dataset for which similar datasets are sought, one or more statistical measures or other structural descriptions of which datasets are sought, or any other information from which system 230 may retrieve one or more datasets.

Processor 234 may be configured to apply one or more models of series of nodes 240 (e.g., one or more of a neural network type, a Bayesian network type, a support vector machine type, a random forest type, or another type of model within the layers) to dataset(s), associated metadata, or related synthetic data included in or generated based on the query in order to search the indexed datasets using tags and probabilities generated by the series of nodes 240. Accordingly, processor 234 may be configured to search for datasets having tags and/or probabilities matching or similar to those generated by the series of nodes based on the query.

In any of the embodiments described above, the model(s) may include statistical algorithms. For example, the model(s) may include regression models that estimate the relationships among variables associated with the sought dataset(s) and generate synthetic sets based thereon. In some aspects, the model(s) may additionally or alternatively sort elements of the sought dataset(s) using one or more classifiers to determine probabilities used to generate synthetic datasets based thereon. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include random forests, composed of a combination of decision trees. Such decision trees may comprise a data structure mapping observations about an input (e.g., the sought dataset(s)), in the "branch" of the tree, to conclusions about a target value, in the "leaves" of the tree. In such aspects, the conclusions may be used to generate synthetic data based on the observations about the input. An individual tree may depend on the values of a random vector sampled independently and with the same distribution for a plurality of (or all) trees in the forest. Any other machine learning models may be applied in addition to or in lieu of a random forest model.

In another example, additionally or alternatively, the model(s) may include Bayesian networks. The Bayesian network may comprise a directed acyclic graph (DAG). In some embodiments, the nodes of the DAG may represent Bayesian variables, such as observable quantities, latent variables, unknown parameters or hypotheses, or the like. Edges of the DAG may represent conditional dependencies between the nodes. Moreover, each node may be associated with a probability function that accepts, as input, a particular set of values for the node's parent variables, and outputs a probability (or probability distribution) of the variable represented by the node.

In yet another example, additionally or alternatively, the model(s) may include support vector machines. The support vector machine may comprise a non-probabilistic binary linear classifier. In some embodiments, the support vector machine may comprise one or more hyperplanes in a high- or infinite-dimensional space used to classify datasets.

In response to execution of the query and/or an instruction to compare datasets (e.g., stored in databases 232, receiving via an interface, or the like), series of nodes 240 may generate tags and associated probabilities for the retrieved dataset(s) and/or datasets to compare. Series of nodes 240 may comprise the first nodes 210 of system 200, the second nodes 212 of system 200, nodes not included in first nodes 210 or second nodes 212, or any combination thereof. Accordingly, series of nodes 240 may include one or more models, such as one or more neural networks, Bayesian networks, support vector machines, random forest models, or the like for classifying datasets.

Although not depicted in FIG. 2B, processor 234 may further train and/or re-train one or more of series of nodes 240 before application to the retrieved dataset(s) and/or datasets to compare. For example, processor 234 may use training data (e.g., from database(s) 236) and/or the received query to train the one or more nodes. In embodiments where training data is used, processor 234 may further use the retrieved dataset(s) and/or datasets to compare to re-train the one or more nodes.

In embodiments where the retrieved dataset(s) and/or datasets to compare include associated metadata, one or more nodes of series of nodes 240 may generate the tags and/or associated probabilities based on the metadata. Additionally or alternatively, the query and/or an instruction to compare datasets may include or otherwise instruct processor 234 to generate synthetic data and, accordingly, one or more nodes of series of nodes 240 may generate the tags and/or associated probabilities based on the synthetic data.

Using the tags and/or associated probabilities from series of nodes 240, vectorizer 242 may generate vectors associated with the retrieved dataset(s) and/or datasets to compare. For example, each vector may be associated with at least one column within the retrieved dataset(s) and/or datasets to compare. As used herein, a vector may refer to any multi-dimensional measure as distinguished from a scalar. Vectorizer 242 may arrange the associated probabilities along multiple dimensions (e.g., each dimension being associated with a corresponding tag and/or category for the column) to generate the vectors. In such an example, one or more components of the vectors may be indicative of distances between columns in the retrieved dataset(s) and/or datasets to compare with respect to different dimensions (e.g., categories).

In some embodiments, system 230 may output the vectors without further processing. In other embodiments, comparator 244 may further determine one or more measures of distance between the retrieved dataset(s) and/or datasets to compare (and/or between columns of the same). For example, a measure of distance may comprise one or more composite scores based on distances between the vectors from vectorizer 242 or components of the vectors. In such an example, distances between vectors of corresponding columns within the retrieved dataset(s) and/or datasets to compare may be summed, averaged, or otherwise combined into the composite distance between datasets. Additionally or alternatively, distances between vectors may be used directly to determine differences amongst columns of the same dataset and/or between columns of different datasets.

Additionally or alternatively, comparator 244 may cluster one or more vectors or components of the vectors associated with the retrieved dataset(s) and/or datasets to compare. For example, comparator 244 may apply one or more thresholds to one or more vectors or components of the vectors or distances therebetween in order to classify the retrieved dataset(s) and/or datasets to compare into one or more clusters. Additionally or alternatively, comparator 244 may apply hierarchical clustering, centroid-based clustering, distribution-based clustering, density-based clustering, or the like to the one or more vectors or components of the vectors associated with the retrieved dataset(s) and/or datasets to compare or the distances therebetween. In any of the embodiments described above, comparator 244 may perform fuzzy clustering such that each retrieved dataset and/or dataset to compare (and/or each column of the same) has an associated score (such as 3 out of 5, 22.5 out of 100, a letter grade such as 'A' or 'C,' or the like) indicating a degree of belongingness in each cluster. The measures of distance may then be based on the clusters (e.g., distances between clusters including the datasets or columns of the same, or the like).

Although depicted as a software module in FIG. 2B, comparator 244 may additionally or alternatively be implemented as one or more hardware comparators.

As depicted in FIG. 2B, the results (e.g., the retrieved dataset(s) and/or datasets to compare, optionally with one or more determined measures of distance) may be output for storage, e.g., in databases 236. Additionally or alternatively, the results may be output to an external device, e.g., another server, a third party data repository (e.g., AMAZON WEB SERVICES S3 buckets), a user such an administrator diagnosing a problem, or the like. For example, the results may be output using one or more graphical user interfaces (GUIs), such as that depicted in FIG. 5.

Figure 3:
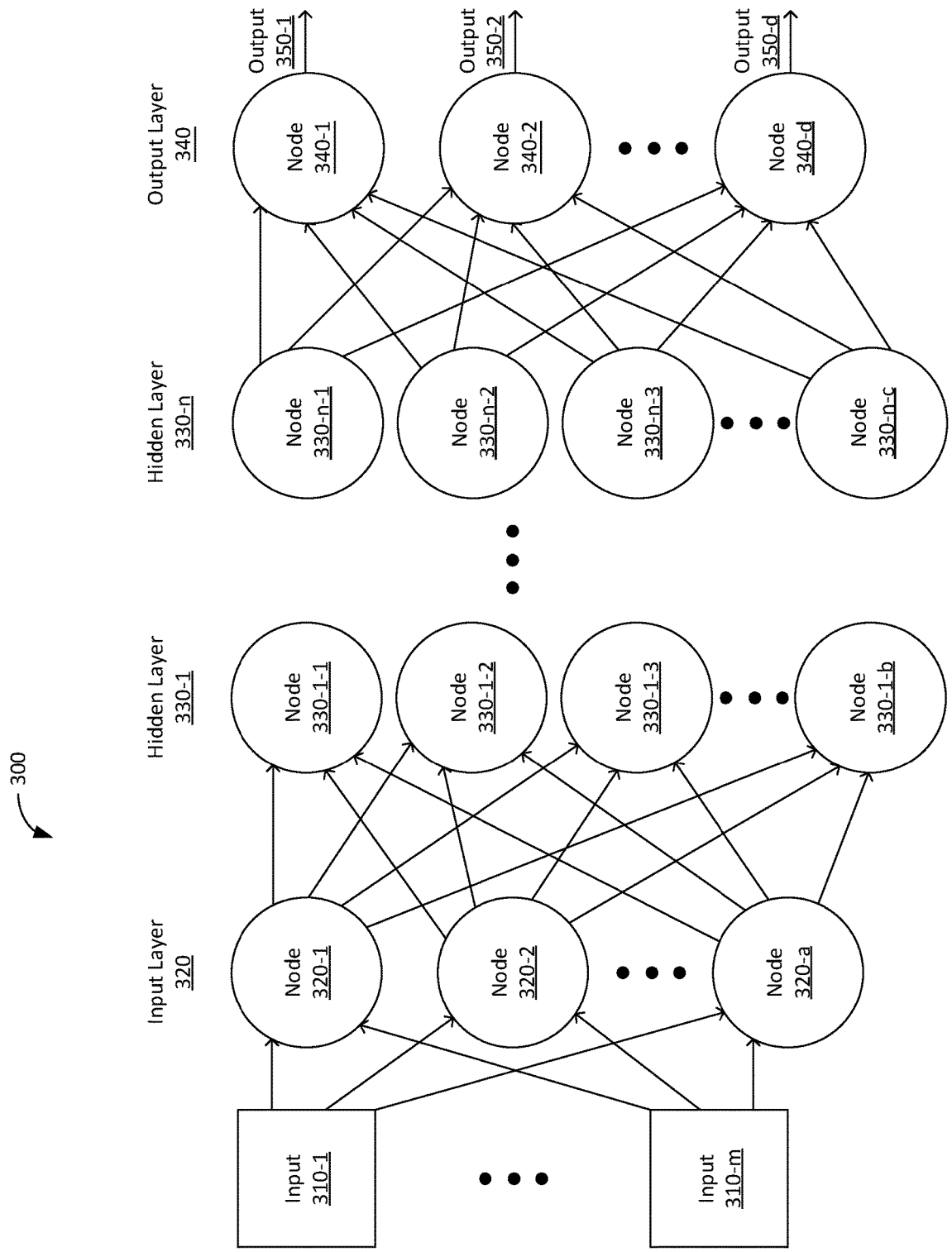
FIG. 3 depicts an exemplary neural network having at least one hidden layer for classifying datasets, consistent with disclosed embodiments.

FIG. 3 is an illustration of exemplary neural network 300 having at least one hidden layer. As depicted in FIG. 3, neural network 300 may include an input layer 320 that accepts inputs, e.g., input 310-1, . . . , input 310-$m$. Inputs may include an image, text, or any other structure or unstructured data for processing by neural network 300. In some embodiments, neural network 300 may accept a plurality of inputs simultaneously. For example, in FIG. 3, neural network 300 may accept up to m inputs simultaneously. Additionally or alternatively, input layer 320 may accept up to m inputs in rapid succession, e.g., such that input 310-1 is accepted by input layer 320 in one cycle, a second input is accepted by input layer 320 in a second cycle in which input layer 320 pushes data from input 310-1 to a first hidden layer, and so on.

Input layer 320 may comprise one or more nodes, e.g., node 320-1, node 320-2, . . . , node 320-$a$. Each node may apply an activation function to corresponding input (e.g., one or more of input 310-1, . . . , input 310-$m$) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 3, neural network 300 may include one or more hidden layers, e.g., hidden layer 330-1, . . . , hidden layer 330-*n*. Each hidden layer may comprise one or more nodes. For example, in FIG. 3, hidden layer 330-1 comprises node 330-1-1, node 330-1-2, node 330-1-3, . . . , node 330-1-*b*, and hidden layer 330-*n* comprises node 330-*n*-1, node 330-*n*-2, node 130-*n*-3, . . . , node 330-*n*-*c*. Similar to nodes of input layer 320, nodes of the hidden layers may apply activation functions to output from connected nodes of the previous layer and weight the output from the activation functions by particular weights associated with the nodes. As explained above with respect to FIGS. 2A and 2B, these hidden layers may be used by autoencoders to generate feature matrices.

As further depicted in FIG. 3, neural network 300 may include an output layer 340 that finalizes outputs, e.g., output 350-1, output 350-2, . . . , output 350-*d*. Output layer 340 may comprise one or more nodes, e.g., node 340-1, node 340-2, . . . , node 340-*d*. Similar to nodes of input layer 320 and of the hidden layers, nodes of output layer 340 may apply activation functions to output from connected nodes of the previous layer and weight the output from the activation functions by particular weights associated with the nodes. In some embodiments, output layer 340 may generate structure versions of data input to input layer 320. In other embodiments, output layer 340 may generate synthetic versions of data input to input layer 320.

Although depicted as fully connected in FIG. 3, the layers of neural network 300 may use any connection scheme. For example, one or more layers (e.g., input layer 320, hidden layer 330-1, . . . , hidden layer 330-*n*, output layer 340, or the like) may be connected using a convolutional scheme, a sparsely connected scheme, or the like. Such embodiments may use fewer connections between one layer and a previous layer than depicted in FIG. 3.

Figure 4:
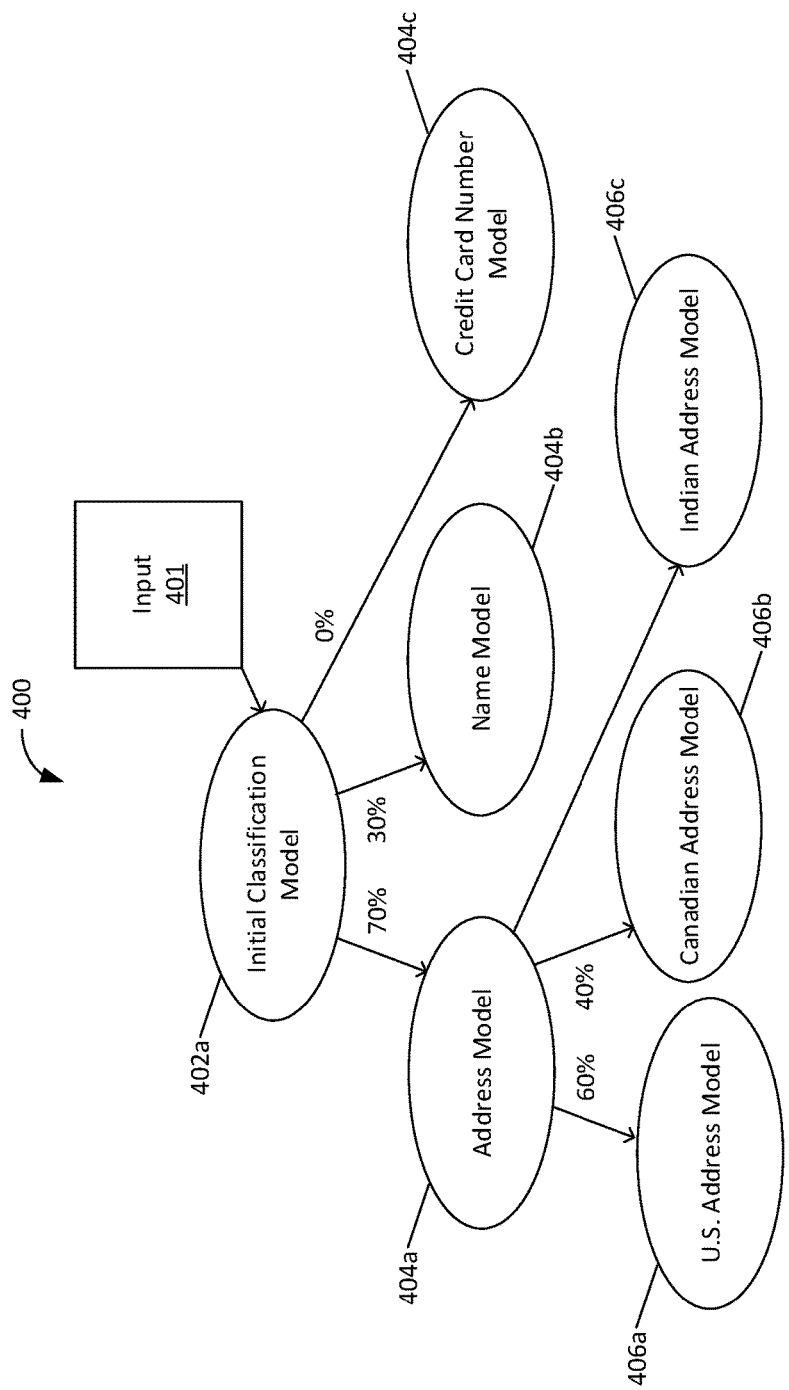
FIG. 4 depicts an exemplary series of nodes arranging a plurality of models, consistent with disclosed embodiments.

FIG. 4 is an illustration of exemplary series of nodes 400. As depicted in FIG. 4, an input 401 may comprise at least a portion of at least one dataset. For example, as explained above, input 401 may comprise a column of the at least one dataset.

As further depicted in FIG. 4, a first level of classification may be represented by one or more first nodes, e.g., node 402*a*. The one or more first nodes may comprise a classification model for input 401. For example, the model may comprise one or more neural networks, Bayesian networks, support vector machines, random forest models, or the like for classifying datasets into one or more categories. Moreover, the model may output one or more tags indicating to which of the one or more categories input 401 belongs. Additionally or alternatively, the model may output one or more scores indicating a degree of belongingness for each of the one or more categories to which input 401 belongs and/or indicating a confidence of the model for each of the one or more categories into which the model classifies input 401.

Using one or more transition rules, series 400 may further feed input 401 to one or more second nodes, e.g., nodes 404*a*, 404*b*, and 404*c*. As depicted in FIG. 4, series 400 may select a subset of the one or more second nodes based on output from the one or more first nodes. For example, as shown in FIG. 4, series 400 may use nodes 404*a* and 404*b* because those nodes are associated with categories and/or tags having associated scores (e.g., belongingness and/or confidence scores) of 70% and 30%, respectively. On the other hand, series 400 may skip node 404*c* because that node is associated with a category and/or tag having an associated score of 0%. Although depicted as excluding second nodes associated with categories and/or tags having associated scores of zero, series 400 may instead use a non-zero threshold to exclude second nodes.

The one or more second nodes may be associated with subcategories of the categories and/or tags output by the one or more first nodes. Accordingly, as shown in the example of FIG. 4, node 404*a* may include a model for classifying addresses, node 404*b* may include a model for classifying names, and node 404*c* may include a model for classifying credit card numbers.

As further depicted in FIG. 4, series 400 may iteratively include additional layers of nodes with models for further subcategories. As shown in the example of FIG. 4, node 406*a* may include a model for classifying U.S. addresses, node 406*b* may include a model for classifying Canadian addresses, and node 406*c* may include a model for classifying Indian addresses.

Accordingly, as shown in the example of FIG. 4, series 400 may further feed input 401 to nodes 406*a* and 406*b* because those nodes are associated with categories and/or tags having associated scores (whether belongingness and/or confidence scores) of 60% and 40%, respectively, but may skip node 406*c* because that node is associated with a category and/or tag having an associated score of 0%. As explained above, series 400 may instead use a non-zero threshold to exclude further nodes. Moreover, the threshold may vary depending on the layer being executed and/or by the preceding node from which series 400 forwards input 401.

In some embodiments, nodes of series 400 may correspond to respective models that generate a score (e.g., a percent likelihood) independently from one another. For example, an address model of node 404*a*, a name model of node 404*b*, and a credit card number model of node 404*c* may share parent node 402*a*. Child nodes 404*a*, 404*b*, and 404*c* may generate scores independently from one another (e.g., 70%, 30%, and 0%, respectively). Although FIG. 4 depicts that a sum of percentages generated by child nodes that share a parent equals 100%, one of skill in the art will understand that this example is not limiting on the embodiments. A sum of percentages determined by child nodes that share a parent may not equal 100%, in some embodiments.

In some embodiments, a parent node may implement models associated with a plurality of child nodes, and the parent node may determine respective scores associated with the child nodes. For example, child nodes 404*a*, 404*b*, and 404*c* may generate output, and initial classification model of parent node 402*a* may generate scores of 70%, 30%, and 0% percent associated with the child nodes child nodes 404*a*, 404*b*, and 404*c*, respectively. As an example, a score associated with node 404*a* may be a high score among child node scores, and a model of node 404*a* may evaluate models of child nodes 406*a*, 406*b*, and/or 406*c* to generate scores associated with a U.S. address (60%), a Canadian address (40%), and an Indian address (0%), respectively.

Although depicted with the categories of addresses, names, and credit card numbers, along with subcategories of country-specific addresses, series 400 may include any appropriate categories and subcategories as long as a particular classification model is trained and included in one or more nodes of series 400. Moreover, although depicted as classifying text, series 400 may include models configured to classify images, video, audio, metadata, or the like.

FIG. 5 is an illustration of exemplary output 500 for showing results of applying a series of nodes (e.g., series 400 of FIG. 4) to columns (e.g. 502*a*, 502*b*, 502*c*, and 502*d*) of one or more datasets. Output 500 may comprise a visual representation of a data structure (e.g., a relational database, a tabular structure, or the like) or may comprise a graphical user interface displayed (e.g., via interface 113 of system 100 of FIG. 1) to a user. As one of skill in the art will appreciate, output 500 may be displayed in formats other than those depicted in FIG. 5, including a tree diagram or a vector representation. In some embodiments, a vector representation of output 500 may include probabilities associated with classification. A vector, tree, or other format of output 500 may allow a user to compare classification results of various datasets.

As depicted in FIG. 5, output 500 may include tags from the series of nodes. For example, an identifier of column 502a and an identifier of column 502b may both be associated with tags for a phone number category, a U.S. phone number category, and a New York City phone number category. Although columns 502a and 502b have one category, one subcategory, and one sub-subcategory, output 500 may use any number of categories and any number of layers of categories. For example, an identifier of column 502c may be associated with tags for a social security number category as well as a telephone category. In another example, an identifier of column 502d may be associated with tags for an identification card number category as well as a telephone category and a District of Columbia identification card number category as well as a U.S. telephone category.

As further shown in FIG. 5, output 500 may include probabilities (or other scores indicating belongingness or confidence) from the series of nodes. For example, an identifier of column 502a may be associated with a probability of 97% for the phone number category, a probability of 78% for the U.S. phone number category, and a probability of 85% for the New York City phone number category. Accordingly, output 500 may indicate that the series of nodes was 97% confident that column 502a includes phone numbers; 78% confident that, if column 502a includes phone numbers, the phone numbers are U.S. numbers; and 85% confident that, if column 502a includes U.S. phone numbers, the phone numbers are New York City phone numbers. Similarly, an identifier of column 502b may be associated with a probability of 97% for a phone number category, a probability of 65% for the U.S. phone number category, and a probability of 60% for the New York City phone number category.

For columns having more than one category, more than one subcategory, or the like, such as columns 502c and 502d, output 500 may include multiple probabilities per layer of categorization. For example, an identifier of column 502c may be associated with a probability of 57% for the social security number category as well as a probability of 43% for the telephone category. In another example, an identifier of column 502d may be associated with a probability of 45% for the identification card number category as well as a probability of 55% for the telephone category and a probability of 65% for the District of Columbia identification card number category as well as a probability of 55% for the U.S. telephone category. Although depicted as summing to 100% for the first layer of categorization, the stored probabilities may not always sum to 100%. For example as shown for the subcategories of column 502d, the probabilities may not sum to 100% if the series of nodes do not include one or more categories (and thus corresponding tags) in output 500, e.g., due to associated probabilities (or scores) below a threshold for inclusion in output 500, as discussed above with respect to FIG. 4.

Figure 6:
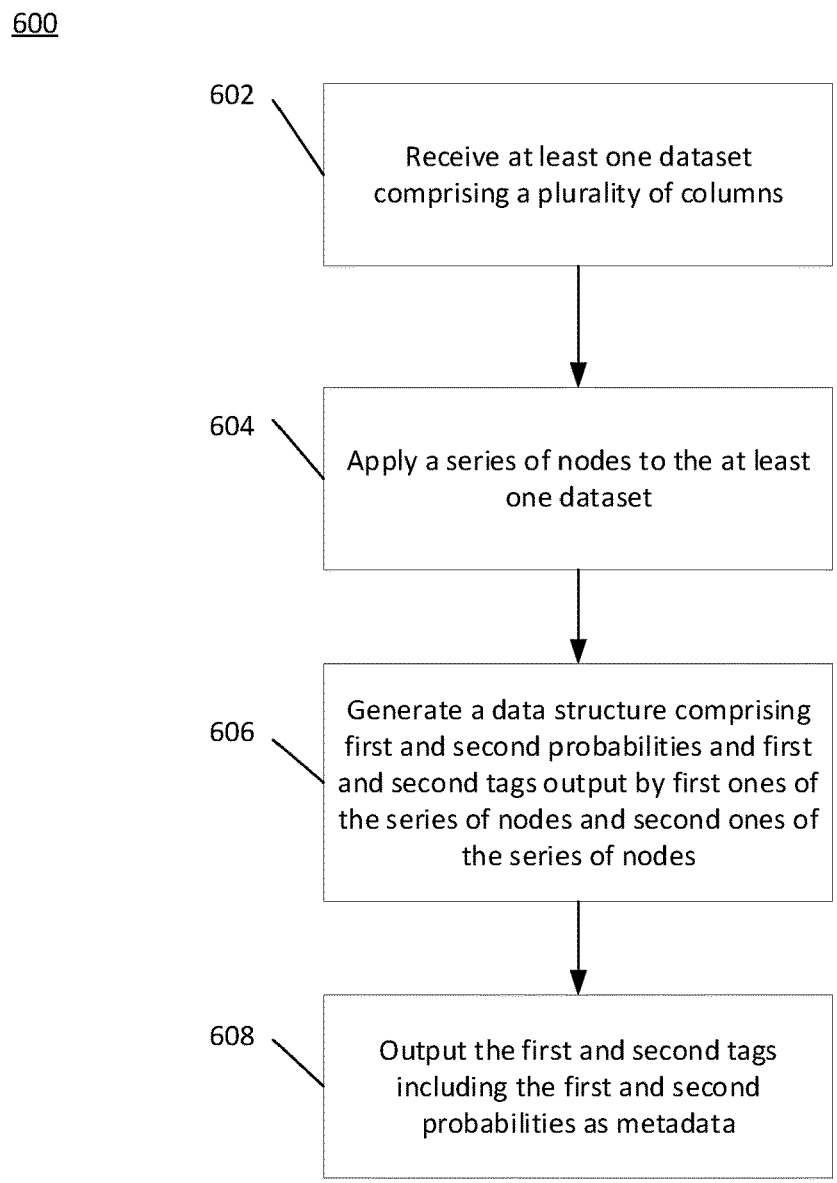
FIG. 6 depicts an exemplary process for indexing datasets using a series of nodes, consistent with disclosed embodiments.

FIG. 6 is a flow diagram of an exemplary process 600 for tagging datasets by a plurality of nodes. Process 600 may be executed by a system, e.g., system 200 described above.

At step 602, a processor, e.g., processor 204 of system 200, may receive at least one dataset. As explained above, the at least one dataset may comprise a plurality of columns. The processor may receive the at least one dataset from a repository (e.g., database(s) 202 of system 200) and/or input from a user (e.g., via interface 113 of system 100).

In some embodiments, the at least one dataset may comprise at least one of a plurality of text files, a plurality of spreadsheets, or a plurality of images. Additionally or alternatively, the at least one dataset may comprise a tabular data structure, another relational database, or the like.

At step 604, the processor may apply a series of nodes to the at least one dataset. For example, as depicted in FIG. 4 and explained above, the processor may apply one or more first nodes (e.g., node 402a), then proceed to a subset of one or more second nodes (e.g., nodes 404a and 404b) based on output from the one or more first notes, and subsequently to further layers (e.g., nodes 406a and 406b) based on output from preceding layers.

Accordingly, the application may comprise applying a first one of the nodes, comprising at least one machine learning model, to generate at least one first probability; appending a first tag based on the at least one first probability; selecting second ones of the nodes subsequent in the series based on the at least one first probability; and iteratively applying the second nodes to generate second probabilities and second tags. In some embodiments, and as explained with respect to FIG. 4, proceeding to one of a plurality of nodes subsequent in the series may comprise applying one or more transition rules (e.g., one or more inequalities, one or more thresholds, or the like) to the at least one first probability (e.g., a confidence score, a degree of belongingness, or the like) to select the second nodes (e.g., selecting nodes 404a and 404b and not node 404c) subsequent in the series. In addition to or in lieu of one or more inequalities, the one or more transition rules may comprise a threshold configured to halt the iterative application.

In some embodiments, the application may further comprise terminating the iterative application upon one of the following conditions: a final node in the series has been applied; or one of the second probabilities is below a threshold. For example, if nodes 406a, 406b, and 406c comprise a bottom layer of series 400 in the example of FIG. 4, the processor may halt execution after applying nodes 406a and 406b, which were selected as explained above. In another example, if node 402a, 404a, or the like, generates one or more probabilities below the threshold (e.g., indicating the model of the node cannot generate a classification with confidence above the threshold), the processor may halt execution and not apply subsequent layers of classification (e.g., applying none of nodes 406a, 406b, and 406c).

In any of the embodiments described above, the processor may apply the series of nodes individually to each of the columns. For example, the processor may extract the columns from the at least one dataset before executing step 604.

As explained with respect to FIG. 4, the second tags may comprise subcategories of the first tag. For example, nodes 404a, 404b, and 404c are all subcategories of the initial classification of node 402a, and nodes 406a, 406b, and 406c are all subcategories of the classification of node 404a.

In any of the embodiments described above, at least two nodes in the series may comprise different machine learning model types. For example, the different machine learning model types may include at least one of a neural network type, a Bayesian network type, a support vector machine type, or a random forest type. Additionally or alternatively, at least two of the nodes in the series may have been trained using different training sets. In such embodiments, the processor may perform the training of the at least two of the nodes in the series using the different training sets.

At step 606, the processor may generate a data structure comprising the first and second probabilities and the first and second tags. For example, the data structure may comprise tabular data, a relational or graphical database, a graphical user interface (e.g., as depicted in FIG. 5), or the like.

At step 608, the processor may output the first and second tags including the first and second probabilities as metadata. For example, as depicted in FIG. 5, the probabilities may comprise metadata for the tags, which themselves may comprise metadata for or otherwise be linked to identifiers of the columns of the at least one dataset.

In some embodiments, the metadata may further comprise an indicator of the condition terminating the iterative application. For example, as explained above with respect to step 604, when the iterative application terminates when a final node in the series has been applied, the processor may store an indicator that all layers of nodes were applied and/or of the final node(s) executed before termination. Moreover, when the iterative application terminates when one of the second probabilities is below a threshold, the processor may store an indicator of the one or more second probabilities triggering the threshold and/or of the final node(s) executed before termination.

Additionally with or alternatively to outputting the first and second tags including the first and second probabilities as metadata, the processor may output information relating to a data schema based on the first and second tags. For example, the first and second tags may define a form or standardized format (e.g., based on a categorization defined by the first and second tags) into which one or more of the columns may be stored, and outputting information relating to a data schema may include outputting information describing the standardized format or any other information relating to a data schema of the first and second tags.

Additionally or alternatively, the processor may generate a relational index such that the received at least one dataset is retrievable using the first and second tags and/or the first and second probabilities. In other embodiments, the processor may generate a graphical index such that each column of the at least one dataset is a node and is connected, via an edge, to one or more nodes representing the first and second tags. In such embodiments, the one or more nodes may include one or more attributes representing the first and second probabilities. Accordingly, the processor may generate a graphical index that is has a tree structure, a vector structure, and/or another structure.

In addition, the processor may cluster the indexed columns using the first and second tags and/or the first and second probabilities. For example, the clustering may include applying one or more thresholds to one or more vectors calculated using the first and second tags and/or the first and second probabilities or other components of the first and second tags and/or the first and second probabilities to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each column has a score associated with a degree of belonging in each cluster generated by the clustering. In such embodiments, the processor may store the corresponding columns in association with each degree of belonging.

Method 600 may further include additional steps. For example, the processor may enable searching for datasets (and/or columns of the datasets) using the index. For example, the processor may store the at least one dataset with the index such that the index is searchable. In embodiments where columns are clustered, the processor may additionally store the clusters in association with the at least one dataset.

Figure 7:
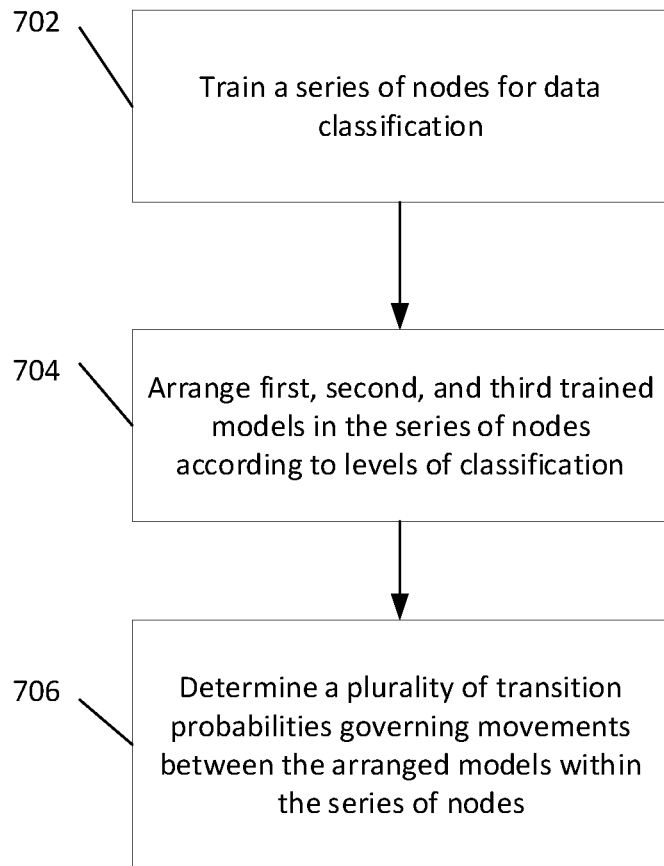
FIG. 7 depicts an exemplary process for training models arranged in a series of nodes for indexing datasets, consistent with disclosed embodiments.

FIG. 7 is a flow diagram of an exemplary process 700 for building an ensemble model for tagging datasets consistent with disclosed embodiments. Process 700 may be executed by a system, e.g., system 200 described above.

At step 702, a processor, e.g., processor 204 of system 200, may train a series of nodes. For example, the training may comprise training at least one first machine learning model to classify a column of data within a first category; training a plurality of second machine learning models to classify the column of data within a plurality of subcategories of the first category; and iteratively training third machine learning models to perform subclassifications of the plurality of subcategories. The training may comprise minimization (or at least reduction) of one or more associated loss functions with the machine learning models by adjusting activation functions, weights, or any other parameters of the machine learning models.

In some embodiments, at least one first machine learning model and at least one of the second machine learning models may comprise different machine learning model types. For example, the different machine learning model types may include at least one of a neural network type, a Bayesian network type, a support vector machine type, or a random forest type.

Additionally or alternatively, training the at least one first machine learning model and at least one of the second machine learning models using different training sets. For example, the different training sets may reflect the different categorizations and subcategorizations described above.

At step 704, the processor may arrange the trained first, second, and third models in the series according to levels of classification. For example, the processor may arrange the trained models in a series of nodes as depicted in FIG. 4.

At step 706, the processor may determine a plurality of transition probabilities governing movement between the arranged models. For example, the transition probabilities may comprise one or more inequalities. Additionally or alternatively, the transition probabilities may include a threshold configured to halt a flow of data through the series of nodes. Accordingly, the transition probabilities may allow iterative application of the arranged models, e.g., as described in step 604 of method 600.

Although method 700 may be generally described herein as comprising first, second, and third models in a series, it is to be understood that method 700 may include more or fewer models in a series. Further, in some embodiments, method 700 may further include additional steps. For example, method 700 may further include training at least one replacement machine learning model using an updated training set; replacing at least one of the first machine learning model or at least one of the second machine learning models with the at least one replacement machine learning model; and updating one or more of the transition probabilities to integrate the at least one replacement machine learning model into the series of nodes. Accordingly, method 700 may allow the processor to periodically update the arranged models for use on datasets. The periodic updates may be regular (e.g., once per hour, once per day, or the like) or dynamic (e.g., whenever new training data is available or the like).

In such embodiments, a machine learning model type of the at least one replacement machine learning model may be different than a machine learning model type of the replaced model. For example, the machine learning model types may comprise at least one of a neural network type, a Bayesian network type, a support vector machine type, or a random forest type.

FIG. 8 is a flow diagram of an exemplary process 800 for comparing datasets tagged by a plurality of nodes consistent with disclosed embodiments. Process 800 may be executed by a system, e.g., system 230 described above.

At step 802, a processor, e.g., processor 234 of system 230, may receive a plurality of datasets. As explained above, the plurality of datasets may comprise a plurality of columns. The processor may receive the plurality of datasets from a repository (e.g., database(s) 202 of system 200) and/or input from a user (e.g., via interface 113 of system 100).

In some embodiments, the at least one dataset may comprise at least one of a plurality of text files, a plurality of spreadsheets, or a plurality of images. Additionally or alternatively, the at least one dataset may comprise a tabular data structure, another relational database, or the like.

At step 804, the processor may apply a series of nodes to at least one first column of a first one of the datasets, the series comprising a plurality of levels. Further, at step 804, the processor may apply the series of nodes to at least one second column of a second one of the datasets. For example, as depicted in FIG. 4 and explained above, the processor may apply one or more first nodes (e.g., node 402a), then proceed to a subset of one or more second nodes (e.g., nodes 404a and 404b) based on output from the one or more first notes, and subsequently to further layers (e.g., nodes 406a and 406b) based on output from preceding layers.

In some embodiments, applying the series of nodes may comprise applying a first one of the levels and proceeding to subsequent second ones of the levels based on first probabilities and/or first tags (as described below with respect to step 806). Moreover, and as explained with respect to FIG. 4, proceeding to subsequent second ones of the levels may comprise applying one or more transition rules (e.g., one or more inequalities, one or more thresholds, or the like) to the first probabilities (e.g., a confidence score, a degree of belongingness, or the like) and/or the first tags to select a next node (e.g., selecting nodes 404a and 404b and not node 404c) in the subsequent second ones of the levels. In such embodiments, the one or more transition rules comprise one or more inequalities. Additionally or alternatively, the one or more transition rules further comprise a threshold configured to halt applying the series of nodes.

In some embodiments, the application may further comprise terminating the iterative application upon one of the following conditions: a final node in the series has been applied; or one of the second probabilities is below a threshold. For example, if nodes 406a, 406b, and 406c comprise a bottom layer of series 400 in the example of FIG. 4, the processor may halt execution after applying nodes 406a and 406b, which were selected as explained above. In another example, if node 402a, 404a, or the like, generates one or more probabilities below the threshold (e.g., indicating the model of the node cannot generate a classification with confidence above the threshold), the processor may halt execution and not apply subsequent layers of classification (e.g., applying none of nodes 406a, 406b, and 406c).

In any of the embodiments described above, the processor may apply the series of nodes individually to each of the columns of the plurality of datasets. For example, the processor may extract the columns from the plurality of datasets before executing step 804.

In any of the embodiments described above, at least two nodes in the series may comprise different machine learning model types. For example, the different machine learning model types may comprise at least one of a neural network type, a Bayesian network type, a support vector machine type, or a random forest type.

Additionally or alternatively, at least two of the nodes in the series may have been trained using different training sets. In such embodiments, the processor may perform the training of the at least two of the nodes in the series using the different training sets.

At step 806, the processor may receive, based on application of the series of nodes, a plurality of first probabilities associated with the levels. Additionally or alternatively, the processor may receive, based on application of the series of nodes, a plurality of first tags associated with the levels.

As explained with respect to FIG. 4, the first probabilities and/or the first tags may be further associated with a category and one or more subcategories for the at least one first column. For example, nodes 404a, 404b, and 404c are all subcategories of the initial classification of node 402a, and nodes 406a, 406b, and 406c are all subcategories of the classification of node 404a.

Further at step 806, the processor may receive, based on application of the series of nodes, a plurality of second probabilities associated with the levels. Additionally or alternatively, the processor may receive, based on application of the series of nodes, a plurality of second tags associated with the levels.

Similarly, the second probabilities and/or the second tags may be further associated with a category and one or more subcategories for the at least one second column. For example, nodes 404a, 404b, and 404c are all subcategories of the initial classification of node 402a, and nodes 406a, 406b, and 406c are all subcategories of the classification of node 404a.

At step 808, the processor may determine, using the first probabilities and/or the first tags, a first vector associated with the at least one first column. The first vector may therefore comprise a numerical representation of the first tags.

Further at step 808, the processor may determine, using the second probabilities and/or the second tags, a second vector associated with the at least one second column. Similarly, the second vector may therefore comprise a numerical representation of the second tags.

As explained above with respect to FIG. 2B, the processor may arrange the associated probabilities along multiple dimensions (e.g., each dimension being associated with a corresponding tag and/or category for the column) to generate the first and second vectors. In such an example, one or more components of the vectors may be indicative of distances between columns in the retrieved dataset(s) and/or datasets to compare with respect to different dimensions (e.g., categories). Additionally or alternatively, the processor may convert the first and second tags to scores or other numerical values and arrange the scores along multiple dimensions to generate the first and second vectors.

At step 810, the processor may output a distance between the at least one first and the least one second columns, based on the first and second vectors. For example, the processor may calculate an absolute distance between the first and second vectors or a normalized distance between the first and second vectors (e.g., normalized based on a magnitude of the first vector and/or the second vector, normalized based on one or more maxima and/or minima associated with the dimensions, or the like).

In some embodiments, outputting the distance comprises generating a visualization of the at least one first and the at least one second columns within a state space. For example, the visualization may comprise a graphical depiction of the state space with dots or any other shapes representing the first and second vectors within the state space.

In some embodiments, the processor may further index the plurality of datasets using the first and second vectors. For example, the processor may generate a relational index such that the plurality of datasets are retrievable using the first and second vectors. In other embodiments, the processor may generate a graphical index such that each dataset is a node and is connected, via an edge, to one or more nodes representing the first and second vectors.

In addition, the processor may cluster the indexed datasets using the first and second vectors. For example, the clustering may include applying one or more thresholds to magnitudes (whether absolute or normalized) of the first and second vectors or other components of the first and second vectors to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each dataset (or column of each dataset) has a score associated with a degree of belonging in each cluster generated by the clustering. In such embodiments, the processor may store the corresponding datasets (or columns of the datasets) in association with each degree of belonging.

In some embodiments, method 800 may further include additional steps. For example, the processor may enable searching for datasets (or columns of the datasets) using the index. For example, the processor may store the plurality of datasets with the index such that the index is searchable. In embodiments where datasets are clustered, the processor may additionally store the clusters in association with the plurality of datasets.

Although described with respect to two columns, the processor may use method 800 to compare any number of columns within the plurality of datasets. For example, method 800 may include applying the series of nodes to at least one first column of a first one of the datasets, at least one second column of a second one of the datasets, at least one third column of the first one of the datasets, and at least one fourth column of the second one of the datasets to generate, respectively, first probabilities and/or tags, second probabilities and/or tags, third probabilities and/or tags, and fourth probabilities and/or tags. In such embodiments, the processor may determine a distance between the first one of the datasets and the second one of the datasets using distances between first and second vectors based on the first probabilities and/or tags and the second probabilities and/or tags, respectively and between third and fourth vectors based on the third probabilities and/or tags and the fourth probabilities and/or tags, respectively. Although this example used four columns total, two from each of two datasets, method 800 may similarly extrapolate to any number of columns from any number of datasets such that the processor may calculate corresponding distances between vectors associated with the columns and use said distances to further calculate composite distances between the datasets.

As explained above with respect to methods 600 and 800, systems of the present disclosure may index datasets according to tags and/or probabilities generated by a series of nodes (e.g., series 400 of FIG. 4) and/or vectors calculated using the tags and/or probabilities. Accordingly, systems of the present disclosure may further allow for searching of such indexed datasets (or columns of the datasets), e.g., as described below.

For example, system 200 or 230 may receive a search query including a model, a sample dataset, or relevant tags, probabilities, and/or vectors. In some embodiments, the query may comprise a database language query (such as a structure query language (SQL) command). In other embodiments, the query may comprise a natural language query. In such embodiments, the processor (e.g., processor 204 of system 200 or processor 234 of system 230) may apply natural language processing to the query to determine one or more datasets relevant to the query and generate, based on the relevant datasets, a database language query corresponding to the natural language query for executing.

In embodiments where the query includes a model, system 200 or 230 may extract tags, probabilities, and/or vectors based on a classification associated with the model (e.g., one or more categories, one or more subcategories, or the like). For example, categories, subcategories, and the like extracted from the model may determine relevant tags. Additionally or alternatively, categories, subcategories, and the like extracted from the model may determine ranges of the probabilities and/or ranges of dimensions for the vectors.

In embodiments where the query includes a sample dataset, system 200 or 230 may calculate tags, probabilities, and/or vectors by applying a series of nodes to the query. For example, as explained above with respect to methods 600 and 800, the application may comprise applying a first one of the nodes, comprising at least one machine learning model, to generate at least one first probability; appending a first tag based on the at least one first probability; proceeding to second ones of the nodes subsequent in the series based on the at least one first probability; and iteratively applying the second nodes to generate second probabilities and second tags. In some embodiments, and as explained with respect to FIG. 4, proceeding to one of a plurality of nodes subsequent in the series may comprise applying one or more transition rules (e.g., one or more inequalities, one or more thresholds, or the like) to the at least one first probability (e.g., a confidence score, a degree of belongingness, or the like) to select the second nodes (e.g., selecting nodes 404a and 404b and not node 404c) subsequent in the series. In addition to or in lieu of one or more inequalities, the one or more transition rules may comprise a threshold configured to halt the iterative application.

System 200 or 230 may thus use an index as described above to retrieve at least one dataset (or relevant columns from datasets) based on the tags, probabilities, and/or vectors included in and/or calculated from the query. For example, the processor may apply the SQL command to a relational index. In another example, the processor may apply a ArangoDB query language (AQL) command or other NoSQL command to a graphical index. The index may include tags, probabilities, and/or vectors associated with the datasets (or columns thereof). Moreover, the database of datasets may be clustered, and the clusters may be based on the vectors, as explained above with respect to methods 600 and 800.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure may be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods may be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for tagging datasets comprising:
   at least one processor; and
   at least one non-transitory memory storing instructions that, when executed by the at least one processor cause the at least one processor to perform operations comprising:
   receiving a dataset;
   applying a series of nodes to the dataset, comprising:
      applying a first node of the series of nodes to the dataset, the first node comprising at least one first machine learning model outputting at least one first probability, the first node preceding a plurality of second nodes in the series of nodes;
      determining a first tag based on the at least one first probability;
      applying a transition rule to the at least one first probability;
      in response to a result of the application of the transition rule to the at least one first probability:
         selecting a first one of the second nodes for processing the dataset;
         processing the dataset with the selected first one of the second nodes; and
         selectively preventing a data flow of the dataset through a second one of the second nodes and a third node following the second one of the second nodes; and
      applying the selected first one of the second nodes to the dataset to output a second probability and an associated second tag;
   training the series of nodes, the training comprising:
      training the at least one first machine learning model to classify a column of data within a first category, each of the second nodes comprising a second machine learning model; and
      training the second machine learning models to classify the column of data within a plurality of subcategories of the first category;
   generating a data structure comprising the first and second probabilities and the first and second tags; and
   outputting the data structure as metadata.

2. The system of claim 1, wherein:
   applying the first node comprises applying the trained at least one first machine learning model to the dataset; and
   selecting the first one of the second nodes comprises selecting one of the trained second machine learning models.

3. The system of claim 1, wherein the rule comprises one or more inequalities.

4. The system of claim 3, wherein the transition rule further comprises a threshold configured to halt the application processing of the dataset.

5. The system of claim 1, wherein the second tag comprises a subcategory of the first tag.

6. The system of claim 1, wherein the data structure comprises at least one of a tree structure or a vector.

7. The system of claim 1, wherein the at least one machine learning
   model comprises at least one of a neural network type, a Bayesian network type,
   a support vector machine type, or a random forest type.

8. The system of claim 1, wherein the training further comprises training at least two of the series of nodes using different training sets.

9. The system of claim 1, wherein the data structure comprises information related to a data schema based on the first and second tags.

10. A system for building an ensemble model for tagging datasets, comprising:
    at least one processor; and
    at least one non-transitory memory storing instructions that, when executed by the at least one processor cause the at least one processor to perform operations comprising:
    training a series of nodes, the nodes comprising machine learning models, the training comprising:
       training at least one first machine learning model to classify a column of data within a first category, the first category comprising a plurality subcategories;
       training a plurality of second machine learning models to classify the column of data; and
       iteratively training third machine learning models to perform subclassifications of the subcategories;

arranging the trained first, second, and third models in the series of nodes by assigning the trained first, second, and third models to the nodes according to hierarchical levels of the first category, the subcategories, and the subclassifications; and determining a plurality of transition probabilities governing data movement between the arranged models by applying one or more respective transition rules to outputs from the first, second, and third models in the series of nodes, the transition rules comprising one or more inequalities and a threshold configured to:

selectively allow a flow of data through a first one of the nodes corresponding to a first one of the trained second models; and selectively prevent a flow of data through:

a second one of the nodes corresponding to a second one of the trained second models; and a third one of the nodes following the second one of the nodes, the third one of the nodes corresponding to one of the trained third models.

11. The system of claim 10, wherein the at least one first machine learning model and at least one of the second machine learning models comprise different machine learning model types.

12. The system of claim 11, wherein the different machine learning model types comprise at least one of a neural network type, a Bayesian network type, a support vector machine type, or a random forest type.

13. The system of claim 10, wherein the operations further comprise training the at least one first machine learning model and at least one of the second machine learning models using different training sets.

14. The system of claim 10, wherein the operations further comprise:

training at least one replacement machine learning model using an updated training set;

replacing the at least one first machine learning model or at least one of the second machine learning models with the at least one replacement machine learning model; and updating one or more of the transition probabilities to integrate the at least one replacement machine learning model into the series of nodes.

15. The system of claim 14, wherein a machine learning model type of the at least one replacement machine learning model is different than a machine learning model type of the replaced model.

16. The system of claim 15, wherein the machine learning model types comprise at least one of a neural network type, a Bayesian network type, a support vector machine type, or a random forest type.

17. A system for tagging datasets, comprising:

at least one processor; and at least one non-transitory memory storing instructions that, when executed by the at least one processor cause the at least one processor to perform operations comprising:

receiving at least one dataset;

applying a series of nodes to the at least one dataset, comprising:

outputting at least one first probability by applying a first one of the nodes to the at least one dataset, the first node comprising a first machine learning model;

determining a first tag to the at least one dataset based on the at least one first probability;

applying a transition rule to the at least one first probability, the series of nodes further comprising second nodes;

in response to a result of the application of the transition rule:

selecting a first one of the second nodes for processing the dataset; and selectively preventing a data flow of the dataset through a second one of the second nodes and one or more third nodes following the second one of the second nodes in the series of nodes;

applying the selected first node of the second nodes to output a second probability and an associated second tag;

terminating the iterative application upon one of the following conditions:

a final node in the series has been applied; or the second probability is below a threshold;

training the series of nodes, the training comprising:

training the first machine learning model to classify a column of data within a first category, each of the second nodes comprising a second machine learning model; and training the second machine learning models to classify the column of data within a plurality of subcategories of the first category;

generating a data structure comprising the first and second probabilities and the first and second tags; and outputting the data structure as metadata, the metadata further comprising an indicator of the condition terminating the iterative application.

18. The system of claim 1, wherein:

the first machine learning model is trained to perform a first classification task;

the selected first one of the second nodes comprises the second machine learning model trained to perform a second classification task different from the first classification task; and applying the selected first one of the second nodes comprises applying the second machine learning model to the dataset.

19. The system of claim 17, wherein the second tag comprises a subcategory of the first tag.

20. The system of claim 17, wherein the first machine learning model comprises at least one of: a neutral network model, a Bayesian network model, a support vector machine model, or a random forest model.

* * * * *